Patented Oct. 17, 1939

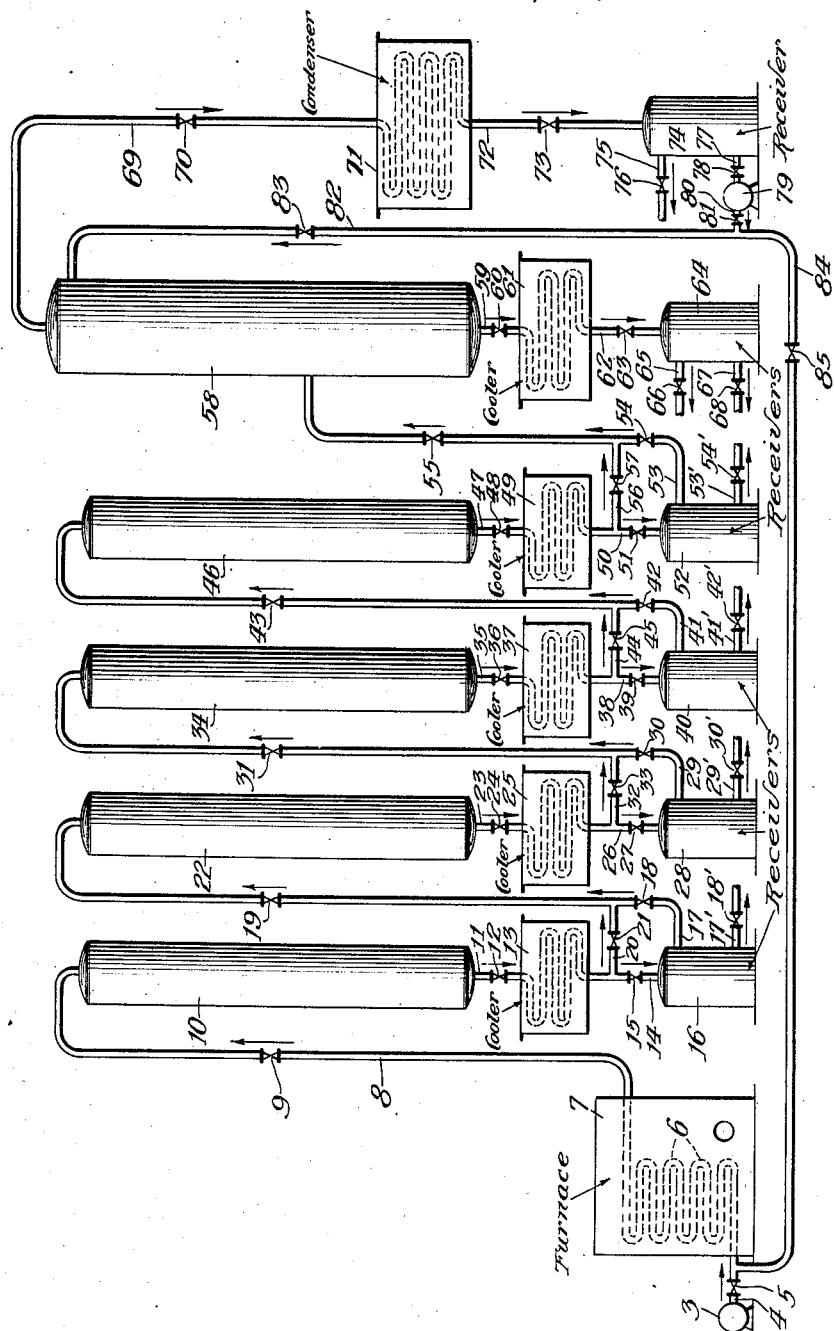

2,176,354

UNITED STATES PATENT OFFICE 2,176,354

TREATMENT OF OLEFIN HYDROCARBONS

Edwin F. Nelson, Chicago, Ill., assignor to Universal Oil Products Company, Chicago, Ill., a corporation of Delaware Application February 29, 1936, Serial No. 66,322

9 Claims. (Cl. 196—10)

This invention relates particularly to the treatment of olefin hydrocarbons which are normally gaseous, although it may be applied as well to liquid olefin hydrocarbons, as will hereinafter appear.

In a more special sense the invention is concerned with improvements in processes wherein olefin hydrocarbons are polymerized in the presence of granular catalytic materials to produce good yields of relatively low molecular weight polymers which are utilizable as high antiknock blending material for motor fuels as such or hydrogenatable to corresponding paraffinic compounds, which retain to a large extent the high antidetonating characteristics of the liquid olefins while being more resistant to the action of acids such as sulfuric acid on account of their saturated character.

The manufacture of motor fuel fractions and particular compounds from normally gaseous olefins is a comparatively recent development from a commercial standpoint and has been accomplished more or less efficiently by both straight thermal treatment and by the use of catalysts. The latter type of process permits the use of lower pressures and temperatures when properly chosen catalysts are employed and results generally in increased capacity and efficiency of commercial plants. Among the types of catalysts which have been employed may be mentioned metal halides such as, for example, aluminum chloride and zinc chloride and mineral acids including sulfuric, phosphoric and hydrochloric.

The reactions of polymerization among olefins are generally exothermic which means that considerable quantities of heat are evolved and that if uniform temperatures are to be maintained in a process of commercial dimensions, means must be provided for dissipating the heat of reaction. Otherwise there will be fluctuations in temperature from point to point in a chamber or treaters so that while a general average temperature may be maintained, there will be high points at which there will be over-polymerization with the development of high boiling liquids and carbonaceous residues which contaminate catalyst particles and low points where the reactions of polymerization are considerably retarded and where there may be in the case of vapor phase processes considerable condensation of liquids which wet the catalyst and impair its efficiency.

While the present improved process is more particularly concerned with those employing solid granular catalysts and more particularly a certain type of such catalysts which will be more minutely described in a later section, it is also applicable to processes employing liquid catalysts such as the liquid mineral acids mentioned or solutions of metal salts such as zinc chloride.

In one specific embodiment, the present invention comprises the polymerization of olefins in hydrocarbon mixtures by contact with solid granular catalysts in successive stages, followed by fractionation of the products and recycling of unconverted materials to the primary polymerizing stage in regulated quantities to dilute the olefinic content of the entering charge to a point at which temperature control is possible.

The feature of thus recycling relatively unreactive hydrocarbon material to the initial stage of a polymerizing process to control the olefin concentration has been found particularly necessary in the case of processes in which the olefins in cracked gas mixtures are exposed to the action of so-called "solid phosphoric acid" catalysts and the following description of an operation of the process is given in connection with these catalysts, though it is to be understood that the feature of the process may as readily be applied to operations employing any type of solid polymerizing catalyst and even to those employing liquid or vaporous catalytic materials. To assist in the description of the process as it is operated in one particular instance the attached diagrammatic drawing has been provided which shows by the use of conventional figures in general side elevation and without regard to exact relationships in the size of the units indicated an arrangement of plant equipment which may be employed.

Referring to the drawing, olefin-containing hydrocarbon mixtures such as, for example, the fractions produced as overhead in the stabilization of primary cracked naphthas or gasolines and commonly known as "stabilizer reflux" are admitted through line 1 containing control valve 2 to a feed pump 3 which discharges through line 4 containing control valve 5 into and through a preliminary tubular heating element 6 arranged to receive heat from a furnace 7. In the case of the stabilizer reflux mentioned which will consist principally of 3 and 4 carbon atom hydrocarbons including propane, propylene, butanes and butylenes, these may be conveniently pumped in liquid phase from the stabilizer reflux drum or may be taken in vapor form from such receivers and brought up to the required pressures by a suitable compressor.

It has been determined that the maintenance of correct temperatures in polymerizing propylene and butenes is of primary importance, the exact temperature necessary for producing maximum yields of gasoline boiling range polymers varying with the total percentage of these olefins in the mixtures introduced and with the relative proportions of 3 and 4 carbon atom olefins. Of the olefins present in such blends isobutylene is by far the most readily polymerized and next in order of reactivity are the n-butenes, propylene and any ethylene which may be present in solution. The ordinary range of temperatures utilizable for stabilizer refluxes of average composition is usually within the range of 250 to 550° F. though in case selective and successive polymerization is desired the temperatures in the initial chambers of a polymerizing plant may be as low as 100° F., under which conditions substantially liquid phase operation is made possible when pressures of the order of 500–600 lbs. per sq. in. are employed. When operating upon the so-called "B—B" fractions produced by close fractionation of stabilizer refluxes, accurate control of temperature is still more imperative if the highest yields of high anti-knock value liquids are to be obtained since in this case the greatest overall efficiency in regard to both yield and quality of product is attained when conditions are so chosen that there is a maximum of mixed polymerization between iso and the n-butenes. In the case of these fractions consisting substantially only of 4 carbon atom hydrocarbons, a temperature between 275 and 325° F. is usually best along with pressures of approximately 550 lbs. per sq. in. and a time of contact of about 5 minutes.

The apparatus shown in the drawing is capable of operating either in liquid or vapor phase. The heated products from heater 6 pass through a line 8 containing a control valve 9 and enter the first of a series of four catalyst chambers 10 which in accordance with the present description will contain a bed of solid granular phosphoric acid catalyst. In the case of vapor phase operation the products will pass downwardly through the catalyst bed and then follow line 11 containing control valve 12 to a cooler 13 and thence through line 14 containing control valve 15 to an intermediate receiver 16. The cooler will only be used to reduce the temperature of the products to a point most favorable to the operation of the second catalyst chamber following and in the case of properly diluted entering mixtures a great deal of cooling may not be applied at this point and the receiver 16 will merely serve to accumulate a small portion of high boiling compounds more or less as a drip, these being removable through a draw line 17' containing a control valve 18'.

In the case of liquid phase operation which is particularly applicable to the previously mentioned "B—B" fractions, the receiver will be cut out of the system and the liquid products will follow line 20 containing control valve 21 to enter line 17 containing control valves 18 and 19 and leading from vapor space of receiver 16 to the second stage treater 22. It will be shown in later examples how the concentration of olefins in the charging stock causes undesirable rise in temperature in the primary stage.

The succeeding catalytic chambers 22, 34 and 46 are given to indicate that polymerization may be effected in a definite number of stages with separation of selected polymers if desired or with simple cooling between stages and a final fractionation of the products. The partially treated materials from line 17 pass downwardly through treater 22 which also contains a bed of catalyst similar to that in treater 10 though if desired the acid content and polymerizing potency may be increased somewhat. And the products again follow line 23 containing control valve 24 to a cooler 25 and thence in the case of vapor phase operation through line 26 containing control valve 27 to a receiver 28 which has a draw line 29' containing control valve 30' and a vapor line 29 containing control valves 30 and 31. Line 32 containing control valve 33 is provided for liquid phase operation.

The products from the second stage pass either in whole or in part through a third bed of catalyst in treater 34 and thence through a line 35 containing a control valve 36 through a cooler 37 and through a line 38 containing control valve 39 to a receiver 40 provided with a liquid draw line 41' containing control valve 42' and having a vapor release line 41 containing control valves 42 and 43, line 44 containing control valve 45 being provided to by-pass the receiver in case of liquid phase operation.

All or part of the products from the third stage may then flow downwardly through a catalyst bed in a treater 46 wherein the potency of the catalyst is still higher and then follow line 47 containing control valve 48 through a cooler 49 and a line 50 containing a control valve 51 to a receiver 52. This final receiver is provided with a liquid draw line 53' containing control valve 54' and a vapor release line 53 containing control valves 54 and 55. In this case line 56 containing control valve 57 permits by-passing receiver 52 in case of liquid phase operation.

In the case of vapor phase operation of the four catalyst chambers described with intermediate separation of the products of stepwise polymerization there may be only a relatively small quantity of material for final fractionation, while in the case of liquid phase operation specially applicable to "B—B" fractions substantially all of the fractionation may be accomplished in the final step. For segregating the products in either event into liquid gasoline boiling range fractions, fixed gases and substantially unreactive paraffinic intermediates, the fractionator 58 has been indicated having a vapor line 69 containing control valve 70 which leads through a condenser 71 followed by a run down line 72 containing control valve 73 and leading to a distillate receiver 74 having a gas release line 75 containing control valve 76. In the majority of instances it is preferable to recycle the intermediate hydrocarbon fractions which correspond approximately to the entering charge in boiling range and the process is preferably operated so that these fractions accumulate in receiver 74. They are then passed through line 77 containing control valve 78 to a pump 79 which discharges through line 80 containing control valve 81 and having branch lines 82 containing control valve 83 leading back to the top of tower 58 and line 84 containing control valve 85 leading to the inlet of the primary heater respectively. When the polymerizing plant has been properly operated there will be substantially no olefins in this intermediate fraction. As a general rule ethylene escapes polymerization in plants of this character (though it may be separately polymerized under more severe conditions) and it will usually be drawn off with the fixed gases vented through line 75 and valve 76.

The material withdrawn from the bottom of fractionator 58 will constitute the total polymer product in the case of liquid phase operation and the polymer product corresponding to the final stage of polymerization in the case of vapor phase operations. This product may require further fractionation in more complicated apparatus than that shown in the drawing and the use of such is comprised within the scope of the invention. However, as shown, the material from the bottom of tower 58 passes through line 59 containing control valve 60 through a cooler 61 and thence through a rundown line 62 containing control valve 63 to a receiver 64 which is equipped with a conventional gas release line 65 containing control valve 66 and a liquid draw line 67 containing control valve 68.

The amount of material which it is necessary to recycle to control the temperature rise in the polymerizing stages will depend upon the plant hook-up and the percentage of olefins in the entering mixtures. In the case of stabilizer refluxes consisting of hydrocarbons of 3 and 4 carbon atoms, and operating under vapor phase conditions, difficulties in temperature control will arise when the total higher olefin content (above ethylene) is over 40% and in the case of "B—B" fractions and liquid phase operation it is frequently necessary to dilute the charge with paraffin recycle fraction to reduce the butene content to some point between 10 and 20% by volume depending upon the ratio of iso- to normal compounds. These critical percentages are only given approximately and will obviously depend upon a number of factors best determined by trial.

Solid phosphoric acid catalysts which are particularly responsive to the present improved type of polymerizing process are prepared in general by mixing either ortho or pyrophosphoric acid with a relatively inert and generally a siliceous carrier, and heating until a solid cake is obtained followed by grinding and sizing to produce particles of approximately 4–20 mesh. This procedure may be modified by extruding the original pasty mix to form pellets of definite size and shape which are then calcined at the temperature found best for producing an acid of optimum polymerizing effectiveness, which usually corresponds to the pyro acid in composition. Unless rehydrating is practiced, a temperature of around 575° F. should not be exceeded in the calcining step and if higher temperatures produce catalyst particles of greater structural strength depending upon the character of the carrier and the proportion of acid mixed therewith, the composition of the acid may be brought to the desired point by a period of contact with superheated steam at approximately 575° F. This brief description of a solid phosphoric acid catalyst and its preparation is not exhaustive as it has already been described in U. S. Patents 1,993,512, 1,993,513, and others.

The following example is given to show the need for the use of a process of the present character to maintain a uniform temperature in catalytic polymerizing chambers and to indicate the improved results obtained by its use though it is not intended that the example should limit the scope of the invention correspondingly.

Runs were conducted in a commercial plant upon a "B—B" fraction having the following average composition:

*Composition of the charge*

| | Per cent |
|---|---|
| Isobutylene | 14 |
| n-Butylenes | 30 |
| Butanes | 56 |

It was attempted to control the operating conditions so that polymerization would be effected in liquid phase and there would be a maximum production of mixed polymers from the iso and n-butenes with resultant maximum octane number in the hydrogenated product. Thus a pressure of 550 lbs. per sq. in. was employed along with a contact time of approximately 300 secs. and an attempt was made to maintain a temperature of 300° F. in a primary catalyst tower of a series similar to that described in the specification. However, it was found that at one period of the operation the temperature at the top of the tower was 240° F., that at the center of the tower was 360° F. and that at the bottom was 328° F. Under these conditions the octane number of the octene fraction produced by hydrogenation of the octene fraction was found to be 91 and it was also determined that there was a yield of approximately 7 gallons of these octenes per 1000 cu. ft. of entering mixture calculated as a gas under normal conditions of temperature and pressure.

In the recycling operation in which a sufficient quantity of the residual butanes was continuously recycled until the butene percentage contacting the primary catalyst bed was about 20% by volume the temperature difference between points in the primary stage was reduced to approximately 20° F. so that it was possible to maintain the temperature within the range of 290–310° F. When operating under these conditions the octane number of the hydrogenated octane fraction was found to be 96 and the yield was 8 gallons per 1000 cu. ft. per charge, with a corresponding diminution in the yield of dodecene fractions.

The nature of the present invention and its commercial utility can be seen from the specification and single example though neither section is intended to be unduly limiting.

I claim as my invention:

1. A process for the mixed polymerization of iso and normal butenes which comprises subjecting a mixture containing iso and normal butenes to the action of a solid phosphoric acid catalyst at a polymerizing temperature above 275° F. under conditions of time and super-atmospheric pressure sufficient to effect substantial interpolymerization of the iso and normal butenes, and controlling the polymerizing temperature to prevent it from increasing to a point above 325° F. as a result of the exothermicity of the reaction by regulating the butene content of said mixture to approximately 10–20%.

2. A process for the mixed polymerization of iso and normal butenes which comprises subjecting a mixture containing iso and normal butenes to the action of a solid phosphoric acid catalyst at a polymerizing temperature above 275° F. under superatmospheric pressure of the order of about 500 to 600 pounds per square inch and for a time sufficient to effect substantial interpolymerization of the iso and normal butenes, and controlling the polymerizing temperature to prevent it from increasing to a point above 325° F. as a result of the exothermicity of the reaction by regulating the butene content of said mixture to approximately 10–20%.

3. A process for producing mixed polymers of iso and normal butenes which comprises subjecting a mixture of butanes and iso and normal butenes to the action of a solid phosphoric acid catalyst at a temperature above 275° F. under superatmospheric pressure of the order of about 500 to 600 pounds per square inch and for a time sufficient to effect substantial interpolymerization of the iso and normal butenes, fractionating the resultant products to separate the butene polymers from the butanes, and preventing the temperature of the exothermic polymerizing reaction from increasing to a point above 325° F. by recycling to the polymerizing step a sufficient quantity of the separated butanes to reduce the butene content of said mixture to approximately 10–20%.

4. A process for producing mixed polymers of iso and normal butenes which comprises subjecting a mixture of butanes and iso and normal butenes to the action of a solid phosphoric acid catalyst at a temperature above 275° F. under superatmospheric pressure of the order of about 500 to 600 pounds per square inch and for a time sufficient to effect substantial interpolymerization of the iso and normal butenes, fractionating the resultant products to separate the butene polymers from the butanes, and dissipating sufficient exothermic heat of the polymerizing reaction to prevent the temperature from increasing to a point above approximately 325° F. by recycling to the polymerizing step an amount of the separated butanes adequate to reduce the butene content of said mixture to about 10–20%.

5. A process for the mixed polymerization of iso and normal butenes which comprises subjecting a mixture containing iso and normal butenes to the action of a solid phosphoric acid catalyst at a polymerizing temperature above 275° F. under conditions of time and superatmospheric pressure sufficient to effect substantial interpolymerization of the iso and normal butenes, and controlling the polymerization temperature to prevent it from increasing to a point above 325° F. as a result of the exothermicity of the reaction by adding to said mixture a sufficient quantity of normally gaseous paraffins to reduce the butene content of the mixture to approximately 10–20%.

6. A process for the mixed polymerization of iso and normal butenes which comprises subjecting a mixture containing iso and normal butenes to the action of a solid phosphoric acid catalyst at a polymerizing temperature above 275° F. under superatmospheric pressure of the order of about 500 to 600 pounds per square inch and for a time sufficient to effect substantial interpolymerization of the iso and normal butenes, and controlling the polymerizing temperature to prevent it from increasing to a point above 325° F. as a result of the exothermicity of the reaction by adding to said mixture a sufficient quantity of normally gaseous paraffins to reduce the butene content of the mixture to approximately 10–20%.

7. A process for the mixed polymerization of iso and normal butenes which comprises subjecting a mixture containing iso and normal butenes to the action of a solid phosphoric acid catalyst at a polymerizing temperature within the approximate range 250–550° F. to effect substantial interpolymerization of the iso and normal butenes, and controlling the polymerizing temperature to prevent it from increasing to a point above said range as a result of the exothermicity of the reaction by regulating the butene content of said mixture to approximately 10–20%.

8. A process for the mixed polymerization of iso and normal butenes which comprises subjecting a mixture containing iso and normal butenes to the action of a solid phosphoric acid catalyst at a polymerizing temperature within the approximate range of 250–550° F. to effect substantial interpolymerization of the iso and normal butenes, and controlling the polymerizing temperature to prevent it from increasing to a point above said range as a result of the exothermicity of the reaction by adding to said mixture a sufficient quantity of normally gaseous paraffins to reduce the butene content of the mixture to approximately 10–20%.

9. A process for the mixed polymerization of iso and normal butenes which comprises subjecting a mixture of butane and iso and normal butenes to the action of a solid phosphoric acid catalyst at a polymerizing temperature within the approximate range of 250–550° C. to effect substantial interpolymerization of the iso and normal butenes, separating the resulting butene polymers from the unpolymerized butane, and controlling the polymerizing temperature to prevent it from increasing to a point above said range as a result of the exothermicity of the reaction by recycling to the polymerizing step a sufficient quantity of the separated butane to reduce the butene content of said mixture to approximately 10–20%.

EDWIN F. NELSON.